Dec. 13, 1949  A. A. GREEN  2,491,260

PITCH CONTROL MECHANISM FOR HELICOPTERS

Filed July 6, 1945  3 Sheets-Sheet 1

INVENTOR
Albert A. Green
BY
Wooster Davis
ATTORNEYS

Dec. 13, 1949     A. A. GREEN     2,491,260

PITCH CONTROL MECHANISM FOR HELICOPTERS

Filed July 6, 1945     3 Sheets—Sheet 3

Example: Curve of differential angular displacement gear 35 with respect to gear 36 as cyclic shaft 39 is revolved about center of gears 37 and 38. All gears have 6" P.D. & 1" eccentricity. Gear 37 is offset 30° relative to gear 38.

INVENTOR.
Albert A. Green
BY
Wooster & Davis
ATTORNEYS

Patented Dec. 13, 1949

2,491,260

UNITED STATES PATENT OFFICE 2,491,260

PITCH CONTROL MECHANISM FOR HELICOPTERS

Albert A. Green, Coral Gables, Fla.

Application July 6, 1945, Serial No. 603,506

17 Claims. (Cl. 170—160.25)

1

This invention relates to a drive and control for the rotor of a helicopter type of aircraft, and has for an object to provide an improved driving means for the blades, including means for simultaneously changing the pitch or angle of attack of the blades to control the lift, and also means for cyclically varying the pitch or angle of attack of the individual blades to control the horizontal flight. The blade can be made to change pitch cyclically, i. e., given a variable change in pitch for every degree of rotation. Also the start of change can be made to commence at any degree of rotation. The blades can also be controlled so that all blades change pitch simultaneously without cyclic variation when hovering is desired.

It is also an object to provide a mechanism for this drive and control which is enclosed in a housing so that the elements are not exposed to the weather or dust and dirt, and, therefore, are effectively protected, and there is a reduction of parasite drag as exposed elements are eliminated.

Another object is to so construct and arrange the mechanism that it is adapted for adequate and easy lubrication.

A further object is to provide a construction in which the rotor column and transmission may be manufactured as a unit.

A still further object is to provide a device of this character which has ease of control and which control may be operated manually or actuated by various mechanisms, as for example, hydraulically, by worms, spur gears or yokes, and the system is also readily adaptable to push-button control.

Another object is to provide a device of this character which is more compact and may be made of lighter weight than is possible with certain systems now employed.

With the foregoing and other objects in view, I have devised the construction illustrated in the accompanying drawings forming a part of this specification. It is, however, to be understood the device is not limited to the specific details of construction and arrangement shown, but may embody various changes and modifications within the scope of the invention.

Figure 1:
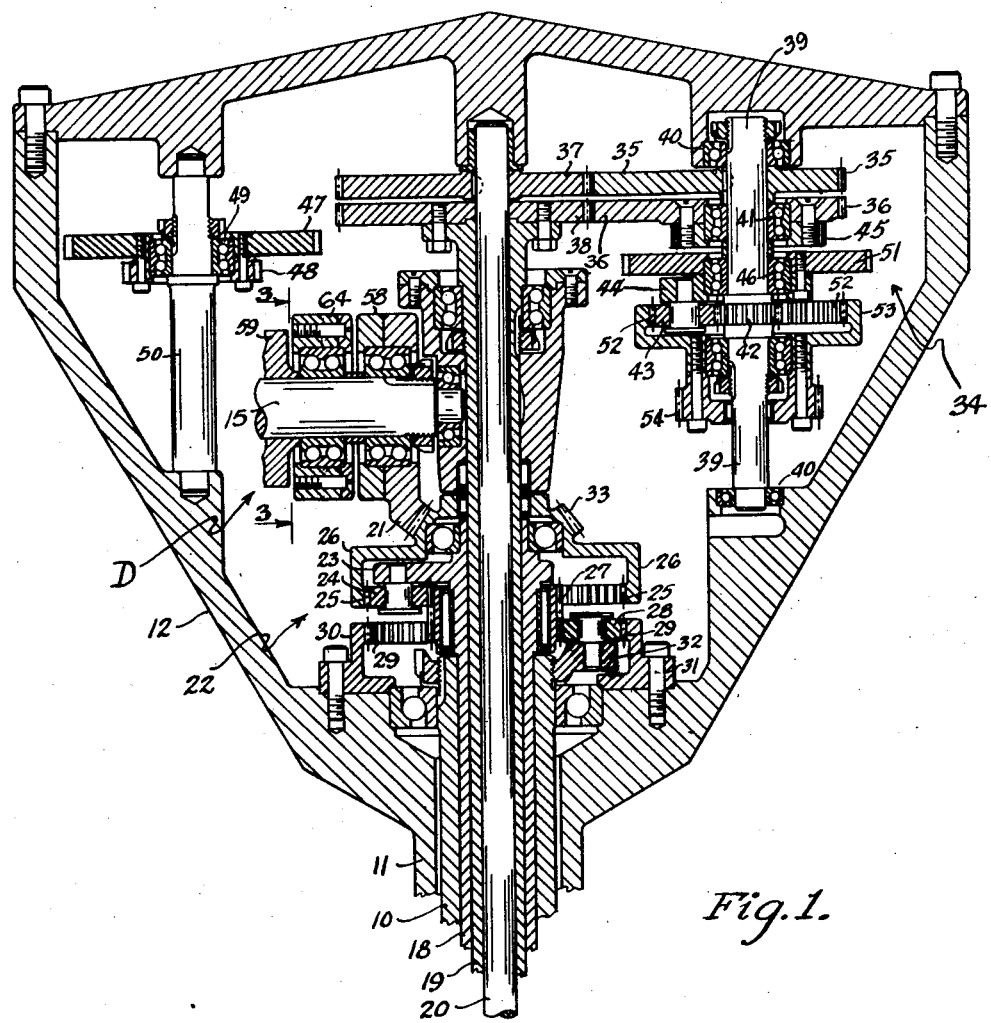
Fig. 1 is a vertical section through the device substantially on the line 1—1 of Fig. 2.
Figure 3:
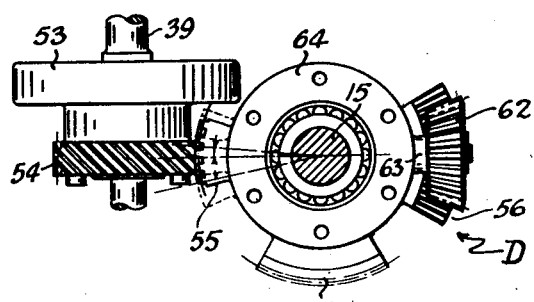
Fig. 3 is a detail view of this differential system taken substantially on line 3—3 of Fig. 1.
Figure 2:
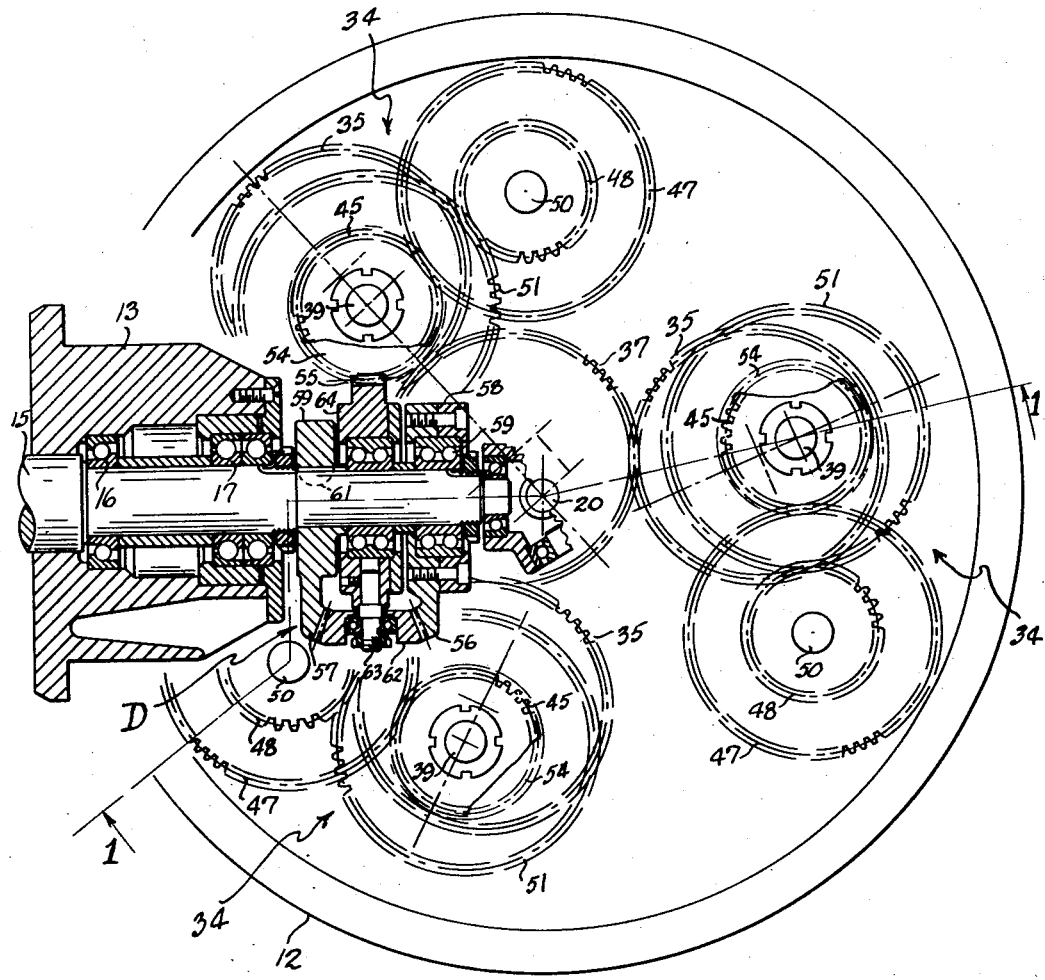
Fig. 2 is a somewhat diagrammatical top plan view looking down on the mechanism from the top with the top or end plate of the casing removed, showing of the specific details being omitted to simplify the drawing, and with the differential system or operating means for a rotor blade being shown in section.
Figure 4:
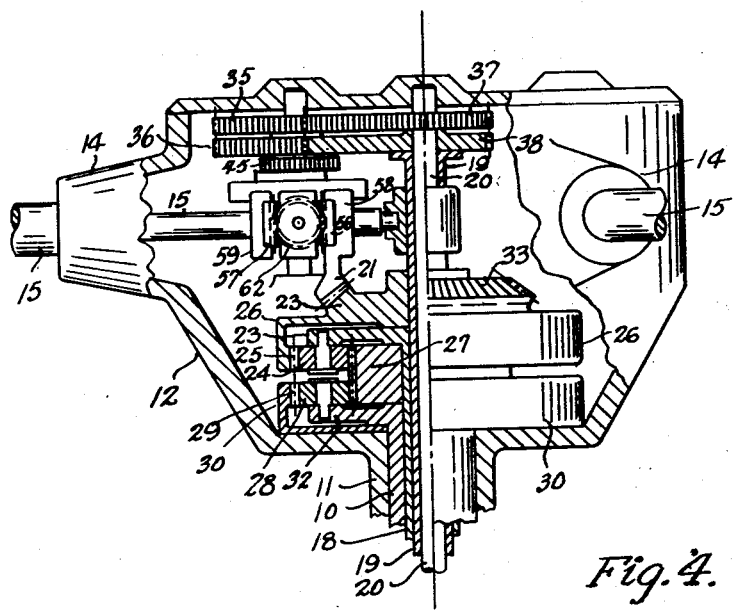
Fig. 4 is a partial side elevation and partial section of the mechanism showing somewhat diagrammatically the vertical control.

As above suggested, this is a drive and control mechanism designed primarily for the horizontal rotating main propeller on a helicopter, rotating about an upright axis, but it is adapted for use in other devices where similar motions or controls are required. In such a device there are three distinct controls which may be considered separately, although the mechanisms for each are tied together and interrelated, so that each may be accomplished as desired and without changing the others.

First there is the vertical control, which is the control for vertical ascent and descent and hovering. This is achieved by simultaneously altering the angle of attack or pitch of all the blades, and to the same amount for each blade.

The second control is a cyclic control necessary for lateral or horizontal flight. This is accomplished by independent cyclic oscillations of individual blade angle of attack and in succession, so that as the blades rotate in the horizontal plane the variation of the angle of attack, or variation of pitch, varies gradually from a minimum to a maximum and then back to the minimum, that is, a variable change in pitch for every degree of rotation, the maximum pitch being at the same point in the circle as each blade successively reaches this point, and the minimum being on the diametrically opposite side. This is an oscillatory or rocking movement of each blade about its longitudinal axis, and instead of being simultaneous for all three blades, as in the adjustment for vertical ascent and descent, it is a gradual turning of each blade from minimum to maximum and back to minimum again of the plurality of blades in succession, as previously indicated.

The third control is the direction of movement, either backwardly, forwardly or sidewise, and is determined by shifting of the point of maximum angle of attack in the cyclic oscillatory motion about the axis of rotation.

The device comprises a fixed column 10 attached to the ship (not shown) and supporting the rotor. This column is located within a rotary drive tube 11 which is geared to the power transmission (not shown) and carries the rotor hub or housing 12. The hub or housing carries the blade attachment mechanism, which may be of any suitable construction, that for a single blade being shown diagrammatically at 13, suitably mounted in the projections 14 and forming a mounting for the shaft 15 of an individual blade, the shaft being mounted in suitable bearings, such, for example, as antifriction bearings 16 and 17, whereby the blade may turn on a longitudinal axis. The hub or housing also encloses the gear mechanism for the various controls outlined above for the rotor blades. This comprises a single vertical control assembly, and a separate assembly for each blade from which is derived the cyclic oscillatory motion necessary for lateral flight. In the present construction, as there are three blades there are three separate assemblies, one for each blade, from which is derived the cyclic oscillatory motion. Within the fixed column 10 are three concentric control shafts 18, 19 and 20. The shaft 18 is for vertical control, and the shafts 19 and 20 are for horizontal flight control. For convenience, the shaft 19 will be called the direction control shaft and shaft 20 the cyclic control shaft. These shafts normally do not rotate, but their positions are adjustable to effect the various degrees of flight control.

Vertical control

Vertical ascent and descent is achieved by simultaneously altering the angle of attack of pitch on all three blades. This is done by means of individual control sectors 21, one for each blade, which operate through a differential system D, hereinafter described, and which for convenience may be called the final drive assembly, on the blade shafts. The position of this control sector 21 is controlled by the vertical control shaft 18 through the vertical control assembly, indicated as a whole by the number 22, located at the lower part of the housing. Carried by the shaft 18 is a control arm 23 on which is mounted an intermediate pinion 24 meshing with an internal annular gear 25 on the following ring 26, and the pinion 24 also meshes with a central free gear 27. A second intermediate pinion 28 meshes with the central free gear 27 and an internal annular driving gear 29 on the driving ring 30 which is mounted on and secured to the lower part of the housing 12 by any suitable means, such as the screws 31, to rotate with the housing. The intermediate pinion 28 is mounted on a fixed arm 32 on the fixed column 10. As the gears 25 and 29 are of the same diameter, and the intermediate pinions 24 and 28 are of the same diameter, when the control arm 23 is stationary the following ring 26 is driven by the driving ring 30 through the pinion 28 on the fixed arm 32, the central free gear 27 and intermediate pinion 24 on the control arm 23, at exactly the same rate as the driving ring 30 and the housing 12. The individual control sectors 21 each mesh with a control bevel gear 33 on the following ring 26, and since these individual control sectors 21 revolve about the rotor axis with the housing, no motion takes place between these sectors and the control bevel gear 33. If, however, the control arm 23 be turned by turning the vertical control tube or shaft 18, a corresponding displacement of the following ring 26, and consequently of the control bevel gear 33, will take place. This forces the three individual control sectors 21 to rotate a corresponding amount, which motion is communicated to the respective blades through the differential assembly D, later to be described. One degree angular displacement of the control arm 23 will cause one degree change in angle of attack of each blade.

Cyclic control

Independent cyclic oscillations of individual blade angle of attack or pitch are derived from the three cyclic motion assemblies, indicated generally by the number 34, one for each blade. This assembly comprises eccentric gears 35 and 36 meshing with similar eccentric gears 37 and 38. The gear 35 is keyed to the cyclic shaft 39 mounted in suitable bearings 40 in the housing. The gear 36 is mounted to turn on this shaft on a suitable bearing 41. Gear 37 is keyed to the cyclic control shaft 20, while the gear 38 is secured to the direction control shaft 19. Secured on the cyclic shaft 39 is a center gear 42 which is driven directly by the gears 37 and 35 through the cyclic shaft 39. The gear 42 meshes with an intermediate or planetary pinion 43 mounted on a rotating arm 44 secured to a gear 51 mounted to rotate on the shaft 39 by suitable bearings 46. This gear 51 meshes with an idler gear 48 secured to a larger gear 47 mounted to rotate by a suitable bearing 49 on a stationary speed change shaft 50 mounted in the housing. The gear 47 meshes with a gear 45 connected with the gear 36 so as to rotate with it.

From this arrangement it will be understood that the center gear 42 is driven directly by the eccentric gears 37 and 35, while the rotating arm 44 is driven by the eccentric gears 38 and 36 through the speed decreasing train of gears 45, 47, 48 and 51. Therefore, the motion of the arm 44 is proportional to the initial action between the gears 38 and 36. Intermediate pinion 43 on arm 44 meshes with an internal annular gear 52 formed on a cyclic motion ring 53 which is connected with a helical gear 54, which in turn meshes with a helical section 55 connected with the differential system or final drive assembly D, in a manner presently to be described. The proportions of the epicyclic system are such that when the eccentric axes of the gears 37 and 38 coincide, no motion will be transmitted to the cyclic motion ring 53. This is because the reducing speed train of gears 45, 47, 48 and 51 decreases the speed of arm 44 carrying the intermediate or planetary gear 43 so that this gear travels around central gear 42 at a speed that no rotation from gear 42 is imparted to outer annular gear 52 and thus no motion is given to ring 53 and gear 54. The proportional diameters of the various gears are given in the following paragraph. If arm 44 rotated at the same speed as gear 42, then there would be no relative movement between gear 42 and gear 43 and gear 52 and ring 53 would have to rotate at the same speed as gear 42. The speed reduction gear train compensates for this so when the eccentric axes of gears 37 and 38 coincide gear 52 and ring 53 are stationary relative to housing 12. However, should the axis of the eccentric gear 37 be given angular displacement (by turning shaft 20) with respect to the axis of the eccentric gear 38, the resulting differential in the velocities of gears 35 and 36 will be communicated proportionally to the cyclic motion ring 53, giving this ring a cyclic oscillatory movement. That is, in this relation during one half revolution the speed of the gear 35 driven by gear 37 lags behind the speed of gear 36 driven by gear 38, and on the other half revolution the speed of gear 35 driven by gear 37 is greater than the speed of gear 36 driven by gear 38. This causes a back and forth or oscillating movement of arm 44 carrying intermediate or planetary gear 43 relative to gear 42, or variation in the relative speed of arm 44 with respect to that of gear 42, which causes a corresponding oscillation of gear 52 and ring 53 relative to housing 12. This latter element 52 by means of helical gear 54 operates through the differential system D on the blade shaft to cause a corresponding cyclic oscillation of the angle of attack of that particular blade. Since the three cyclic shafts 39 and their assemblies 34 are equally spaced around the gears 37 and 38, and since the maximum differential in velocity between gears 35 and 36 occurs at only one point in azimuth, it will be seen that the location in azimuth of the angular displacement of the eccentric axes of gears 37 and 38 need only be changed to cause a corresponding change in the direction of lateral flight. This is achieved by simultaneously rotating the two control shafts 19 and 20 carrying the gears 38 and 37 respectively. One degree differential between the eccentricities of gears 35 and 36 will cause one-third of one degree variation in the angle of attack.

Figure 5:
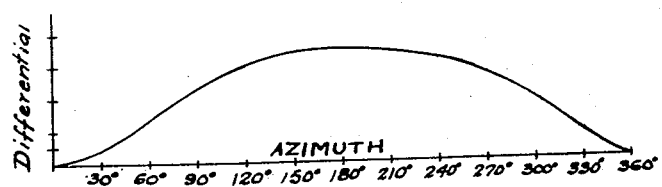
Fig. 5 is a curve showing the differential angular displacement of the blades through each revolution for certain proportions and a given setting of the elements of the cyclic motion mechanism.

An important feature of this control system can be seen in the curve in Fig. 5 showing the differential angular displacement of gear 35 with respect to gear 36 as cyclic shaft 39 is revolved about the common center of gears 37 and 38, for a complete revolution of the housing and the rotor. It will be seen the variation of the angle of attack shows a gradual acceleration and deceleration. In this example all gears 35, 36, 37 and 38 have a 6" pitch diameter and a 1" ececntricity, and gear 37 is offset 30° relative to gear 38. Gears 51 and 47 also have a 6" pitch diameter in the example shown, while gears 48 and 45 have a 3" P. D. and gear 42 and pinion 43 a 1½" P. D. Changes in diameter, eccentricity and angular displacement of the axes of the eccentric gears of this system could generate an unlimited number of differential angular displacements.

The differential system D on the blade shaft, or the final drive assembly, comprises two equal bevel gear sectors 56 and 57, the vertical control sector 56 being connected through the ring assembly 58 with the control sector 21, and the final control sector 57 being carried by the ring 59 keyed to the shaft 15, as indicated at 61. The ring assembly 58 is mounted on suitable bearings 60 to turn relative to the blade shaft 15. Between the sectors 56 and 57 and meshing with both is a free pinion 62 carried by a cyclic arm 63 which is carried by the ring 64 on which is mounted the helical sector 55 meshing with the helical gear 54. Therefore, the free pinion 62 is driven by the motion of the helical gear 54 through the helical sector 55. Thus, movements of the vertical control mechanism and the cyclic motion mechanism can be impressed on the blade shaft through the intermediate free pinion 62 either independently or concurrently. Therefore, each blade can be made to change pitch cyclically, i. e., be given a variable change in pitch for every degree of rotation. Also the start of change can be made to commence at any degree of rotation. The blades can also be controlled so that all blades change pitch simultaneously without cyclic variation when hovering is desired. The gear mechanism creates a linear motion with reversal of motion that can be used in other devices where reciprocal motion is desired.

It will be evident from the above that there are numerous advantages of this system, some of which are, reduction of parasite drag as exposed elements are eliminated; protection of the mechanism from accidents and from the weather, as it is entirely enclosed within the housing; adaptability to adequate and easy lubrication, as the housing may be filled with suitable oil or grease; possibility of manufacturing the rotor column and the transmission as a single unit; ease of control, as the control shafts 18, 19 and 20 may be actuated hydraulically, or by worms, spur gears or yokes, and the system is readily adaptable to push-button control; the possibility of lower specific weight in large sizes than can be obtained by other methods; and attractive appearance.

The complete design will include various features and details which are not shown, to simplify the disclosure and avoid complications, such as suitable blade suspension from properly located pivots, provision for damping motion about the vertical pin, suitable gear reduction drive unit with free wheeling device incorporated, complete control system including suitable limit stops, and, if such is deemed advisable, governor control of rotor pitch to prevent stalling and automatically induce autorotation in case of power failure.

Having thus set forth the nature of my invention, what I claim is:

1. A self-contained attitude control of the character described, comprising an upright fixed column, a hub housing mounted to rotate on said column, means for mounting a plurality of helicopter blades on said housing to turn about their respective longitudinal axes to vary their angle of attack, a cyclic motion assembly for each blade mounted within the housing and capable of imparting independent cyclic oscillations to the respective blades about their longitudinal axes as they rotate about said column, and a differential drive within the housing connecting a cyclic motion assembly to each blade and capable of imparting the motions of said assembly to the blade comprising a gear sector connected to the blade, a second gear sector, a free pinion meshing with both gear sectors, a movable support for the pinion, means connecting the pinion support with a cyclic motion assembly for operation by said assembly, and means for normally holding the second gear sector stationary and capable of turning said sector to turn the first sector.

2. In a device of the character described, a rotatable housing, a plurality of blades mounted on the housing to turn about their respective longitudinal axes to vary their pitch, means for giving independent cyclic oscillation to the individual blades about their longitudinal axes comprising a pair of normally stationary eccentric gears, a cyclic motion assembly for each blade comprising a shaft, a pair of eccentric gears mounted on said shaft one of which meshes with one of the first pair of gears and the other with the other of the first pair of gears, one of the second pair of gears being keyed to the shaft and the other being free to rotate thereon, a central gear secured to the shaft, a planetary pinion meshing with the central gear and mounted on a support rotatable about said shaft, a speed decreasing drive from the second gear of the second pair of eccentric gears to said support, an annular gear also meshing with the planetary pinion, and a drive connection from the annular gear to the blade to impart the oscillatory motions of said gear to the blade.

3. In a device of the character described, a rotatable housing, a plurality of blades mounted on the housing to turn about their respective longitudinal axes to vary their angle of attack, means for imparting independent cyclic oscillations to the individual blades about their longitudinal axes comprising a pair of normally stationary eccentric gears, a cyclic motion assembly for each blade comprising a shaft mounted in the housing laterally of said gears to rotate with the housing, a second pair of eccentric gears mounted on the shaft and each in mesh with one of the first pair of gears respectively, one of the second pair of gears being secured to the shaft and the other being free thereon, a central gear secured to the shaft, an annular gear concentric therewith and spaced outwardly therefrom, a planetary pinion located between and meshing with the central and annular gears mounted on a rotary support, a speed decreasing drive from the free eccentric gear to said support, means connecting the annular gear with the blade to impart the oscillatory movements of said gear to the blade, and means for turning one of the first pair of eccentric gears relative to the other to vary the angle between their eccentric axes.

4. In a device of the character described, a rotary housing, a plurality of blades mounted on the housing to turn about their respective longitudinal axes to vary their angle of attack, means for imparting independent cyclic oscillations to the individual blades about their longitudinal axes comprising a pair of normally stationary eccentric gears, a cyclic motion assembly for each blade comprising a second pair of eccentric gears each in mesh with one of the first pair of eccentric gears respectively and mounted to rotate with the housing about said first pair of gears, and an epicyclic gear train connecting the second pair of gears with the blade capable of imparting cyclic oscillatory motion thereto to vary the pitch of the blade.

5. In a device of the character described, a rotary housing, a plurality of blades mounted on the housing to turn about their respective longitudinal axes to vary their angle of attack, means for imparting independent cyclic oscillations to the individual blades about their longitudinal axes comprising a pair of normally stationary eccentric gears mounted to be turnable about a common axis, means to turn each gear individually about said axis to vary the angle between the eccentric axes of the gears and also change the position of this angle about said common axis, a cyclic motion assembly for each blade comprising a second pair of eccentric gears each in mesh with one of the first pair of eccentric gears respectively and mounted to rotate with the housing about said first pair of gears, and an epicyclic gear train connecting the second pair of gears with the blade capable of imparting cyclic oscillatory motion thereto about its longitudinal axis.

6. In a device of the character described, a rotary housing, a plurality of blades mounted on the housing to turn about their respective longitudinal axes to vary their angle of attack, means for imparting independent cyclic oscillations to the individual blades about their longitudinal axes comprising a pair of normally stationary eccentric gears mounted to be turnable about a common axis, means to turn each gear individually about said axis to vary the angle between the eccentric axes of the gears and also change the position of this angle about said common axis, a cyclic motion assembly for each blade comprising a shaft mounted in the housing laterally of said gears to rotate about the gears with the housing, a second pair of eccentric gears mounted on the shaft and each in mesh with one of the first pair of gears respectively, one of the second pairs of gears being secured to the shaft and the other being free thereon, a central gear secured to the shaft, an annular gear concentric with the shaft and of larger diameter than the central gear so as to be spaced outwardly from the central gear, a planetary pinion located between and meshing with the central and annular gears mounted on a rotary support, a speed decreasing drive from the free eccentric gear to said support, and means connecting the annular gear with the blade to impart the cyclic oscillatory movements of said gear to the blade to vary the pitch of the blade.

7. In a device of the character described, a fixed upright column, a housing mounted to rotate on said column, means for mounting a plurality of helicopter blades on said housing, a cyclic motion assembly for each blade mounted within the housing and capable of imparting independent cyclic oscillations to the respective blades as they rotate about said column to successively vary the individual blade angle of attack, the means of imparting motion from the cyclic control assembly to the blade comprising a pair of like gear sectors one of which is secured to the blade and the other is free, adjustable means normally holding the free sector stationary, a free pinion between and meshing with said sectors mounted on a movable support, and means connecting said support with the cyclic motion assembly to be operated thereby.

8. A self-contained attitude control of the character described, comprising an upright fixed column, a hub housing mounted to rotate on said column, means for mounting a plurality of helicopter blades on said housing to turn about their respective longitudinal axes to vary their angle of attack, a cyclic motion assembly for each blade mounted within the housing and capable of imparting independent cyclic oscillations to the respective blades about their longitudinal axes as they rotate about said column, and a final drive assembly connecting the cyclic motion assembly with the blade comprising a pair of spaced like gear sectors one of which is secured to the blade and the other is free to turn relative thereto, a free pinion between and meshing with said sectors mounted on a movable support, means connecting said support with the cyclic motion assembly for operation thereby, and means normally holding the free sector stationary.

9. In a device of the character described, a rotatable housing, a plurality of blades mounted on the housing to turn about their respective longitudinal axes to vary their angle of attack; a pair of normally stationary coaxial eccentric gears, a cyclic motion assembly for each blade comprising a shaft mounted to rotate with the housing about said eccentric gears, a pair of eccentric gears on the shaft each meshing with one of the first pair of eccentric gears respectively, one of said second pair of eccentric gears being secured to the shaft and the other being free, a center gear secured to the shaft, a cyclic motion ring including an annular gear free on the shaft, an intermediate planetary pinion meshing with the center gear and said latter annular gear and mounted on a movable support, and a speed decreasing gear drive from the latter eccentric gear to said movable support; and a final drive assembly comprising a pair of like gear sectors one of which is secured to a blade and the other is free, a free pinion between and meshing with said sectors mounted on a movable support, and means connecting said support with the cyclic motion ring for operation thereby.

10. In a device of the character described, a rotatable housing, a plurality of blades mounted on the housing to turn about their respective longitudinal axes to vary their angle of attack; a pair of normally stationary coaxial eccentric gears, a cyclic motion assembly for each blade comprising a shaft mounted to rotate with the housing about said eccentric gears, a pair of eccentric gears on the shaft, each meshing with one of the first pair of eccentric gears respectively, one of said second pair of eccentric gears being secured to the shaft and the other being free, a center gear secured to the shaft, a cyclic motion ring including an annular gear free on the shaft, an intermediate planetary pinion meshing with the center gear and said latter annular gear and mounted on a movable support, and a speed decreasing gear drive from the second of the second pair of eccentric gears to said movable support; and a differential drive connecting a cyclic motion ring with each blade capable of imparting the motions of said ring to the blade.

11. A device of the character described as defined in claim 10, in which there is means for turning one of the first pair of eccentric gears driving the cyclic motion assembly relative to the other to vary the angle between the eccentric axes of these gears to vary the motion imparted to the blade from the cyclic motion ring.

12. A device of the character described according to claim 10, in which there is means for turning one of the first pair of eccentric gears relative to the other to vary the angle between the eccentric axes of these gears, and also to turn both said gears together to change the position of this angle about their common axis.

13. In a device of the character described, a pair of normally stationary coaxial eccentric gears, a shaft spaced laterally from said gears, means mounting the shaft to rotate about said gears, a pair of eccentric gears on the shaft each meshing with one of the first pair of gears respectively, one of the second pair of gears being secured to the shaft and the other being free thereon, a center gear secured to the shaft, a cyclic motion ring including an annular gear free on the shaft, an intermediate pinion meshing with the central gear and the annular gear, a movable support for the pinion, a speed decreasing drive from the free gear of the second pair of eccentric gears to the said support, and a member connected with the cyclic motion ring for operation thereby.

14. A device of the character described according to claim 13 in which there is means for turning one of the first pairs of eccentric gears relative to the other to vary the angle between the eccentric axes of said gears and thus vary the motion imparted to the cyclic motion ring.

15. In a device of the character described, a closed rotatable housing, means for mounting a plurality of blades on the housing to turn about their respective longitudinal axes to vary their angle of attack, and a cyclic motion assembly in the housing for each blade comprising an epicyclic gear train inclosed within the housing and connecting the housing with the blade to impart a cyclic oscillatory motion to the blade about its longitudinal axis by turning movement of the housing.

16. In a device of the character described, a rotatable support, means for mounting a propeller blade on said support to turn about its longitudinal axis to vary its angle of attack, a pair of normally stationary coaxial eccentric gears, a second pair of coaxial eccentric gears each meshing with one of the first gears respectively and mounted in the support to rotate therewith about the first pair of gears, and means connected with the second pair of gears for communicating movements to the blade proportional to the differential in velocities of the gears of the second pair imparted thereto by the first pair.

17. In a device of the character described, a rotatable support, a pair of normally stationary eccentric gears mounted for turning movements about a common axis, means for shifting one of the gears about said axis to vary the angle between the eccentric axes of the gears, a second pair of eccentric gears each meshing with one of the first pair of gears respectively and mounted in the support to rotate therewith about the first pair of gears, a movable member, and means connected with the second pair of gears for imparting movements to said member proportional to the differential velocities of the gears of the second pair resulting from their coaction with the first pair.

ALBERT A. GREEN.

REFERENCES CITED

The following references are of record in the file of this patent:

UNITED STATES PATENTS

| Number | Name | Date |
|---|---|---|
| 895,820 | Whitlock | Aug. 11, 1908 |
| 2,020,366 | MacCullum | Nov. 12, 1935 |
| 2,068,617 | Wilford | Jan. 19, 1937 |
| 2,153,610 | Campbell | Apr. 11, 1939 |
| 2,296,892 | Andrew | Sept. 29, 1942 |
| 2,312,376 | Andrew | Mar. 2, 1943 |
| 2,378,967 | Andrew | June 26, 1945 |
| 2,396,590 | McDougal | Mar. 12, 1946 |

FOREIGN PATENTS

| Number | Country | Date |
|---|---|---|
| 648,814 | Germany | Aug. 11, 1937 |